Sept. 15, 1925.  L. PRYCE  1,553,961
DIAMETER GAUGE
Filed July 20, 1922   2 Sheets-Sheet 1
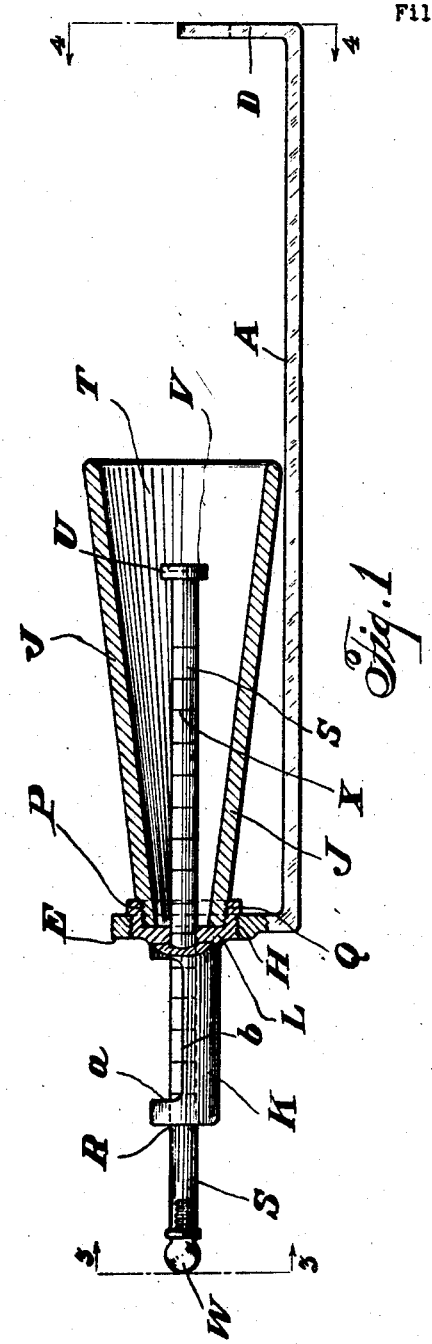
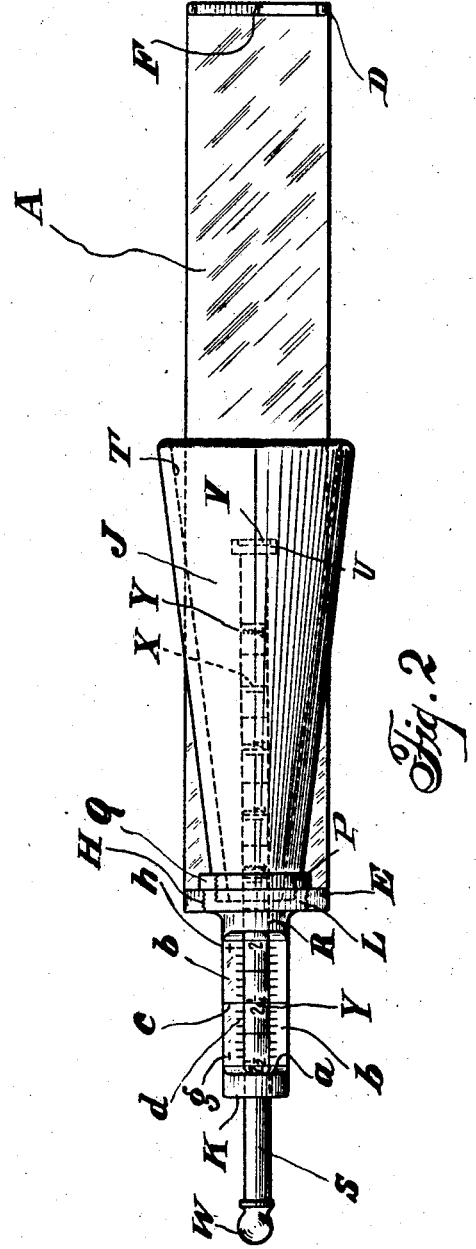
Inventor
Leslie Pryce
By His Attorney
Herbert G. Ogden Sept. 15, 1925.  L. PRYCE  1,553,961
DIAMETER GAUGE
Filed July 20, 1922    2 Sheets-Sheet 2
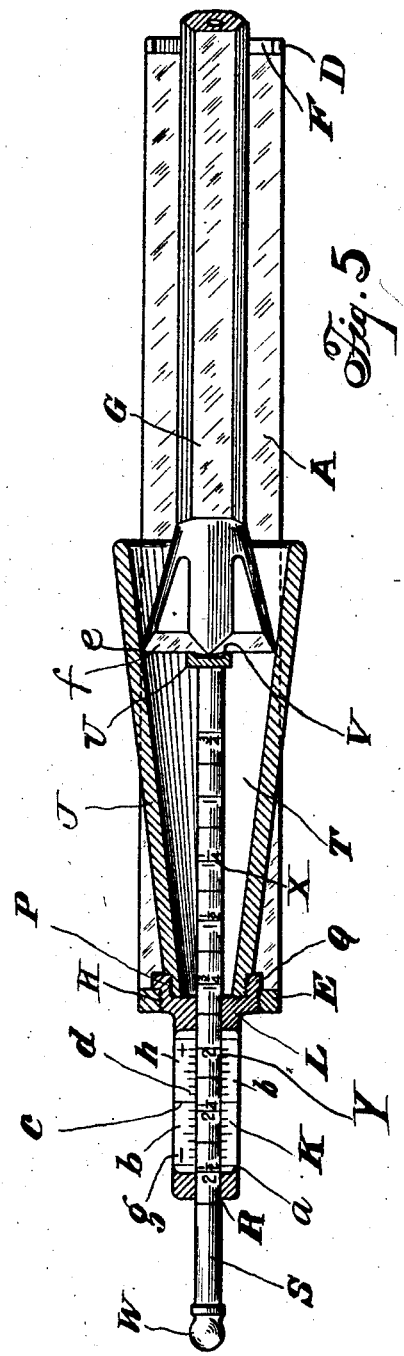
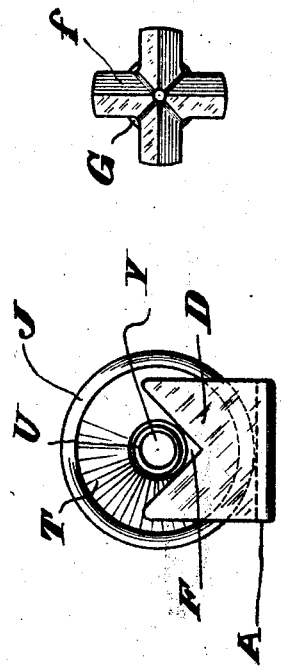
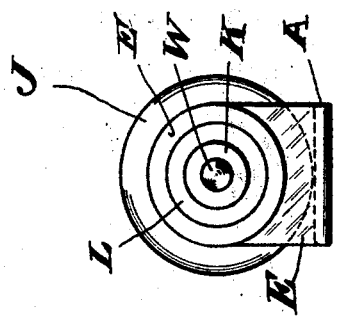
Inventor
Leslie Pryce
By His Attorney
Herbert G. Ogden Patented Sept. 15, 1925.

1,553,961

UNITED STATES PATENT OFFICE.

LESLIE PRYCE, OF JOHANNESBURG, TRANSVAAL, SOUTH AFRICA.

DIAMETER GAUGE.

Application filed July 20, 1922. Serial No. 576,271.

*To all whom it may concern:*

Be it known that I, LESLIE PRYCE, a subject of His Majesty the King of England, and resident of Johannesburg, in the Province of Transvaal, Union of South Africa, have invented certain new and useful Improvements in Diameter Gauges, of which the following is a specification.

My present invention relates to diameter gauges and more particularly to gauges adapted to measure the diameter of articles of more or less irregular external contour, such as the extremities of rock drill bits, but which with certain modifications in constructional details, renders itself capable of measuring the diameters of an exceedingly large range of articles.

I am aware that it has previously been proposed to provide gauges or calipers comprising a tubular shank which has two arms connected therewith which have faces to contact with the objects to be measured, and that diameter gauges comprising a body portion fashioned with a V-shaped fork or a V-shaped recess, in which the objects to be measured are placed, are already known. I am also aware that devices of the character mentioned are provided with various forms of reading scales consisting of a plunger which contacts with the object to be measured and carries a scale plate working in conjunction with a scale adjacent thereto enlarging the reading.

Such known constructions are not satisfactorily applicable to the measurement of the greatest diameter of bodies which are not round or cylindrical; neither is their construction such as to admit of the rapid and accurate gauging of the greatest diameter of the extremities of articles which are not truly cylindrical or round.

The proper gauging of rock drill bits, for instance, is a matter of particular importance. Several bits are usually employed in drilling each hole. During the drilling the bits become reduced in diameter due to the abrasion, so that the hole acquires a taper, and each succeeding bit must be somewhat smaller in diameter than the preceding one in order to properly follow the hole. The difference in sizes between the bits must, however, be reduced to a minimum so that no more rock will be drilled than is necessary to obtain the desired diameter at the bottom, and to accomplish this economically the bits must be accurately formed to the proper diameter.

I have found that gauges at present in use for this purpose are slow in application and the measurements obtained are indefinite and inaccurate, due principally to the difficulty in correctly measuring the diameter of rock drill bits which usually have radial cutting edges and consequently are irregular in contour. Consequently, in the absence of effective inspection large errors occur in the diameter of the bits, making it necessary to allow considerable differences between successive bits, with the result that in many cases the volume of the hole drilled is about 45% greater than would be necessary if the bits were accurately formed. A difference of a small fraction of an inch in the diameter of a bit amounts to a great difference in the volume of rock drilled in a portion of a hole several feet in length. Extensive tests which I have made show that a very small percentage of sharpened drill bits have cutting edges of the correct diameter, most of the errors being on the large side, and of considerable magnitude, which tends to prove that the volume of the holes drilled is almost always greater than necessary.

The primary object of my invention is to enable the diameter of articles to be readily and accurately determined, whether such articles are cylindrical or of irregular external contour.

Another object of my invention is to enable a diameter gauge to effect such determination through the cooperation of a plurality of means which do not depend upon the application of measuring devices to points on the outer irregular surface or perimeter of the article alone, but which employ in addition thereto measuring means applied to the article at a point within its diametrical limits, thus obtaining a positive and exact determination of the diameter of the article from two cooperating sources.

A further object is to enable a diameter gauge to correctly gauge and indicate the diameter of rock drill bits having radial cutting edges. A still further object is to enable a diameter gauge for rock drill bits to be simply, compactly and durably constructed, so that it may be mounted on, or adjacent to, a drill sharpening machine if desired, or elsewhere in convenient reach of the smith. A still further object is to enable the device to be easily operable to accurately and quickly determine and indicate the diameter of the article to be measured. A still further object is to enable the gauge to indicate the difference between the diameter of the bit as determined and a set standard diameter.

In order that my invention may be readily understood and carried into practice, reference is hereby made to the accompanying sheets of illustrative drawings which show by way of example an embodiment of the invention particularly designed for use in connection with measuring the greatest diameter of the wings or cutting edges of rock drill bits, and the like, and wherein:

Figure 1 is a side elevation of the gauge partly in section;

Figure 2 is a top plan view of the gauge;

Figure 3 is a view of the smaller end of the gauge, taken in the plane of the line 3—3 of Figure 1;

Figure 4 is a view of the larger end of the gauge on the line 4—4 of Figure 1;

Figure 5 is a longitudinal sectional view of the gauge showing a rock drill bit introduced into the cone for measurement; and Figure 6 is an end view of a cruciform rock drill bit.

In accordance with my invention I provide a gauge of convenient form having a cone shaped recess therein which is adapted to receive the extremity of the article to be measured, the diameter of such article being determined by the distance that it enters the said cone shaped recess, a scale or slide rule being provided for indicating or recording the accurate diameter of the article being measured and a base or bracket to assist the introduction of the article into the cone for measurement.

Referring more particularly to the embodiment of the invention shown in the annexed drawings, the device comprises a longitudinal base or bracket A adapted to be secured on any suitable support by bolts or otherwise. The bracket A is provided with opposite upturned ends D and E, the end D being formed with a V-shaped opening F in which the shank of a drill steel G may be supported. The opposite upturned end E is enlarged and circular in form, having a circular threaded aperture H, and provides a support for the bit gauge proper. The bit gauge includes an elongated member J in the form of a hollow truncated cone, and a cooperating cylindrical member K having an enlarged diameter portion L at one end. The small diameter end of the conical member J is threaded into a recess located at the extremity of the portion L as shown at P, and the portion L is in turn threaded into the aperture H, a flange Q on the portion L acting as a spacer between the conical member J and the upturned end E.

The member J may be formed of tool steel and hardened or of case hardened mild steel ground out to the required degree, or it may be otherwise composed provided the inside surface is perfectly true and is of some very durable material, the essential feature being observed that the bore T within the member J is cone shaped.

The cylindrical member K has a longitudinal bore R providing a close fit for a longitudinally movable rule S. The rule S is in the form of a plunger extending into the conical bore T of the member J and is preferably formed with an annular head U at its inner extremity, the end of the head being recessed, forming an annular recess V. A knob W is secured to the opposite end of the rule. The knob W and head U in addition to other functions serve to prevent the rule from slipping out of the bore R in either direction. The rule S is graduated at suitable points X along its length, and figures Y corresponding to the graduations X are stamped on the rule S. The graduations and figures are so spaced that they indicate the internal diameter of the elongated conical interior bore T of the member J at various points according to the distance the rule S projects into the conical bore T of the member J. In the present instance the measurements are indicated in terms of inches and fractions thereof, but any desired system of measurement may be employed.

The cylindrical member K is cut away between its opposite ends as shown at a, the cut-away portion extending into the bore R so that the rule S and the graduations thereon are exposed as the rule is moved longitudinally in the bore R. The cut-away portion forms opposite flat parallel sides b and these sides are adapted to act as an indicator provided with index lines c and Vernier marks d, which together constitute indicia adapted to determine the particular graduation of the rule which is applicable to a particular portion of the bore T. The particular portion of the bore T referred to is that point which is at right angles to the rule and in direct vertical alignment with the end of the recess V in the head U at the extremity of the rule S.

In accordance with the present invention, the bit f of the drill steel G is inserted into the end of the member J as far as possible, and owing to the conical shape of the bore T, different sized bits will extend into the bore different distances. The rule S is then moved longitudinally until the head U abuts against the bit f, and the diameter of the bit will be indicated by the figure Y reading in conjunction with the index line c. Figure 2 shows the index line c and the figure 2¼ in registration which indicates that the diameter of the drill steel bit is correct for that particular gauge. However, if the bit possesses a diameter greater or less than the standard which has been set and which it is desired the bit shall meet, the difference between the actual diameter of the bit and the set standard diameter will be indicated by the Vernier marks d between the index lines c and the figure Y nearest thereto, representing the set standard diameter. If the diameter is less than the set standard indicated in Figure 2 the difference will be indicated on the "minus" side g of the indicator, as shown in Figure 5, and if greater than the set standard, on the "plus" side h. The indicator may be marked with appropriate plus and minus signs.

In the present instance the difference of diameter of the article being measured is increased four times on the scale, $\frac{1}{32}$ inch of diameter being represented by ⅛ inch on the scale, making a rapid and accurate reading possible.

In constructing the device the taper of the conical bore T and the correlated graduations X on the rule S are so calculated that they cooperate to correctly determine the diameter of the bore T at the point of rest of the greatest diameter of the article, and the result of such determination is exhibited between the index lines c of the indicator b.

The diameter of the rock drill bit G or other article of irregular external form but regular diameter, is thus determined by means applied both to the outer ends of the cutting edges constituting the diametrical limits of the bit and to a point within such limits. This latter point may be the center of the face of the bit, but as many drill steels and bits are provided with a central bore it is desirable that the head U should engage the bit face at a point or points away from the center. The recess V formed in the end of the head U provides a very satisfactory engaging means for this purpose, because the center of the drill bit if raised or protruding beyond the cutting edge of the bit may enter the recess so that the measurement will always be taken from a uniform point or points. However, other forms may be employed.

The importance of this rapid and accurate gauging of the greatest diameter of the wings or cutting edges of rock drill bits will be readily realized by those skilled in the art, and it is to be understood that various changes might be resorted to in the construction, form and arrangement of the several parts without departing from the spirit and scope of the invention; and that while the present showing and description discloses only one specific embodiment of the invention, others are contemplated.

What I claim is:

1. In a diameter gauge, a member having a conical bore open at its larger end and adapted to receive a drill bit, and graduated indicating means mounted upon said conical member, and comprising two members one of which is movable relatively to the other, one of said members having a scale, said movable indicating member being adapted to be moved against the bit for cooperating with the other graduated indicating member to indicate the diameter of said bit.

2. In a diameter gauge, a member having a conical bore open at its larger end and adapted to receive a drill bit, and graduated indicating means mounted upon said member and comprising two members one of which is movable relatively to the other, one of said members having a scale, said relatively movable member extending into said bore of the conical member and adapted to be moved against said bit for cooperating with the other graduated indicating means to indicate the diameter of said bit.

3. In a diameter gauge, a member having a conical bore open at its larger end and adapted to receive a drill bit, an indicating member connected to the outside of said conical member and having a scale, and another graduated indicating member slidably mounted upon said first indicating member and movable relatively to said scale to indicate the diameter of said bit.

4. In a diameter gauge, a member having a conical bore open at its larger end and adapted to receive a drill bit, an indicating member connected to the opposite smaller end of said conical member and having a scale, and a graduated plunger movably mounted upon said indicating member and extending into said bore and adapted to be moved against said bit for cooperating with said scale to indicate the diameter of said bit.

5. In a diameter gauge, a member having a conical bore open at its larger end and adapted to receive a drill bit, an indicating member connected to the opposite smaller end of said conical member and having a scale thereon, a graduated plunger movably mounted upon said indicating member and adapted to extend into said conical bore, the graduations on the plunger cooperating with the said scale, and a head on said plunger provided with a recess into which a portion of said bit is adapted to enter.

6. In a diameter gauge, a base, means on said base for supporting the shank of a drill steel, a member mounted on said base having a conical bore open at its larger end and adapted to receive the bit of said drill steel, an indicating member connected to the opposite smaller end of said conical member and having a scale thereon, a graduated plunger movably mounted upon said indicating member and adapted to extend into said conical bore, the graduations on said plunger cooperating with said scale and a head on said plunger provided with a recess into which a portion of said bit is adapted to enter.

In testimony whereof, I have signed my name to this specification.

LESLIE PRYCE.